(12) United States Patent
Perrin et al.

(10) Patent No.: US 11,518,194 B2
(45) Date of Patent: Dec. 6, 2022

(54) TIRE COMPRISING A TREAD CONTAINING REINFORCING ELEMENTS

(71) Applicant: COMPAGNIE GENERALE DES ETABLISSEMENTS MICHELIN, Clermont-Ferrand (FR)

(72) Inventors: Frédéric Perrin, Clermont-Ferrand (FR); Patrick Pallot, Clermont-Ferrand (FR); Sylvain Morival, Clermont-Ferrand (FR); Christopher Careme, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 411 days.

(21) Appl. No.: 16/314,123

(22) PCT Filed: Jun. 23, 2017

(86) PCT No.: PCT/FR2017/051676
§ 371 (c)(1),
(2) Date: Dec. 28, 2018

(87) PCT Pub. No.: WO2018/002488
PCT Pub. Date: Jan. 4, 2018

(65) Prior Publication Data
US 2019/0255887 A1   Aug. 22, 2019

(30) Foreign Application Priority Data

Jun. 30, 2016   (FR) .......................................... 1656204
Dec. 2, 2016   (FR) .......................................... 1661863

(51) Int. Cl.
*B60C 11/00*   (2006.01)
*B60C 9/18*   (2006.01)
*B60C 11/13*   (2006.01)

(52) U.S. Cl.
CPC ............ *B60C 11/0066* (2013.01); *B60C 9/18* (2013.01); *B60C 11/1346* (2013.01);
(Continued)

(58) Field of Classification Search
CPC ............... B60C 11/0066; B60C 11/005; B60C 11/18; B60C 11/0041; B60C 11/0008;
(Continued)

(56) References Cited

U.S. PATENT DOCUMENTS

| 6,336,486 B1 | 1/2002 | Iwasaki et al. |
| 7,188,651 B2 | 3/2007 | Suzuki |

(Continued)

FOREIGN PATENT DOCUMENTS

| EP | 9869016 A2 | 10/1998 |
| EP | 1508457 A1 | 2/2005 |

(Continued)

OTHER PUBLICATIONS

Machine translation of JP04-252707 (no date).*

(Continued)

*Primary Examiner* — Steven D Maki
*Assistant Examiner* — Philip N Schwartz
(74) *Attorney, Agent, or Firm* — Venable LLP

(57) ABSTRACT

A tire, the tread of which has an underlayer and a circumferential reinforcement made up of a rubber mixture with a stiffness greater than the stiffness of the rubber mixture and the underlayer, has an outer side and an inner side. The circumferential reinforcement has a reinforcing element of tapered shape positioned in the tread pattern elements disposed axially on the outside with respect to the first or the second circumferential grooves of the tread from the outside to the inside and axially close to the circumferential groove.

10 Claims, 5 Drawing Sheets

(52) U.S. Cl.
CPC ................ *B60C 2009/1842* (2013.01); *B60C 2011/0025* (2013.01); *B60C 2200/06* (2013.01)

(58) Field of Classification Search
CPC ......... B60C 11/1346; B60C 2011/0016; B60C 2011/0033; B60C 2011/0025; B60C 9/18; B60C 2009/1842; B60C 2200/06
See application file for complete search history.

(56) References Cited

U.S. PATENT DOCUMENTS

| | | | |
|---|---|---|---|
| 7,334,618 | B2 | 2/2008 | Suzuki |
| 8,104,523 | B2 | 1/2012 | Losi et al. |
| 8,877,839 | B2 | 11/2014 | Veyland et al. |
| 9,027,615 | B2 | 5/2015 | Dermience et al. |
| 9,623,707 | B2 | 4/2017 | Schweitzer et al. |
| 9,987,884 | B2 | 6/2018 | Guerinon et al. |
| 10,279,629 | B2 | 5/2019 | Hashimoto et al. |
| 2002/0174924 | A1 | 11/2002 | Zanzig et al. |
| 2005/0039834 | A1 | 2/2005 | Suzuki |
| 2005/0045258 | A1 | 3/2005 | Suzuki |
| 2007/0187013 | A1 | 8/2007 | Losi et al. |
| 2008/0105353 | A1* | 5/2008 | Losi ..................... B29D 30/60 152/537 |
| 2012/0283360 | A1 | 11/2012 | Veyland et al. |
| 2012/0318424 | A1 | 12/2012 | Lopitaux et al. |
| 2014/0001454 | A1 | 1/2014 | Miyanami et al. |
| 2014/0069561 | A1 | 3/2014 | Dermience et al. |
| 2015/0107735 | A1 | 4/2015 | Djelloul-Mazouz et al. |
| 2015/0239296 | A1 | 8/2015 | Fukuda |
| 2015/0283854 | A1 | 10/2015 | Saintigny et al. |
| 2015/0328931 | A1 | 11/2015 | Guerinon et al. |
| 2016/0167440 | A1 | 6/2016 | Schweitzer et al. |
| 2017/0050469 | A1 | 2/2017 | Hashimoto et al. |
| 2018/0117972 | A1* | 5/2018 | Perrin ................ B60C 11/0058 |
| 2018/0186189 | A1* | 7/2018 | Pallot ................ B60C 11/0075 |
| 2018/0304693 | A1* | 10/2018 | Pallot ................ B60C 11/0075 |
| 2019/0232720 | A1 | 8/2019 | Prost et al. |
| 2019/0308455 | A1 | 10/2019 | Perrin |
| 2019/0351708 | A1 | 11/2019 | Pallot et al. |
| 2020/0108666 | A1 | 4/2020 | Pallot et al. |

FOREIGN PATENT DOCUMENTS

| | | | | |
|---|---|---|---|---|
| EP | 1 512 554 | A1 | 3/2005 | |
| EP | 2 708 382 | A1 | 3/2014 | |
| EP | 3031627 | A1 | 6/2016 | |
| FR | 2954333 | A1 | 6/2011 | |
| FR | 3035616 | A1 | 11/2016 | |
| JP | 04252707 | A * | 9/1992 | ............ B60C 11/00 |
| JP | 8-34205 | A | 2/1996 | |
| JP | 2010215115 | A * | 9/2010 | ............ B60C 11/00 |
| JP | 2011-183994 | A | 9/2011 | |
| JP | 2014-11392 | A | 1/2014 | |
| JP | 2015-107776 | A | 6/2015 | |
| WO | 2005/063509 | A1 | 7/2005 | |
| WO | 2011/045342 | A1 | 4/2011 | |
| WO | 2014/090845 | A1 | 6/2014 | |
| WO | 2015/170615 | A1 | 11/2015 | |
| WO | 2016/174100 | A1 | 11/2016 | |
| WO | WO-2016174100 | A1 * | 11/2016 | ........... B60C 1/0016 |
| WO | WO-2016202703 | A1 * | 12/2016 | ........... B60C 1/0016 |

OTHER PUBLICATIONS

International Search Report dated Oct. 5, 2017, in corresponding PCT/FR2017/051676 (4 pages).
Copending U.S. Appl. No. 16/485,998, filed Feb. 14, 2018.

* cited by examiner

TIRE COMPRISING A TREAD CONTAINING REINFORCING ELEMENTS

FIELD OF THE INVENTION

The present invention relates to tyres, and more particularly to a tyre, the grip performance of which is improved.

PRIOR ART

As is known, the tread of a tyre, regardless of whether it is intended to be fitted on a passenger vehicle or a heavy-duty vehicle, is provided with a tread pattern comprising, notably, tread pattern elements or elementary blocks delimited by various main, longitudinal or circumferential, transverse or oblique grooves, the elementary blocks also being able to have various finer slits or sipes. The grooves form channels that are intended to evacuate water during running on wet ground and the walls of these grooves define the leading and trailing edges of the tread pattern elements, depending on the direction of the bend.

In order to improve the grip of a tyre, and more particularly for grip on dry and wet ground, it is well known to reduce the stiffness or the stiffness or hardness of the constituent rubber mixture of the tread. This reduction in tread stiffness allows the latter to better match the rough surface of the running surface and thus the actual area of contact with the running surface is increased and the grip performance improved with respect to a tread of which the rubber mixture is stiffer.

However, notably in the case of transverse grip, the use of a less stiff rubber tread mixture promotes shearing of the tread pattern elements and rocking thereof, and this generates greatly raised pressures on the leading edges of the tread pattern elements, which in turn generate very significant heating.

These raised pressures and this heating can contribute towards very rapid damage to the tread of the tyre and to non-optimal exploitation of the grip potential of the rubber mixture of the tread.

In order to improve the performance of tyres having grooves by stabilizing the tread pattern elements, the document EP 2 708 382 A1 proposes a tyre which has, in its tread, a circumferential reinforcement made up of a rubber mixture with a stiffness greater than the stiffness of the rubber mixture of the rest of the tread and positioned under each circumferential groove and extending radially from the radially inner surface of the tread until it forms the entire bottom of the groove.

Document JP H08 342015 A gives another example of this.

The reinforcement of the circumferential grooves that is thus produced makes it possible to increase the drift thrust of the tyre, but the presence of a rigid mixture in the groove bottom makes it difficult to mould the wear indicators. A significant increase in the rolling resistance associated in particular with the limiting of the transverse and longitudinal flattening processes has also been observed.

BRIEF DESCRIPTION OF THE INVENTION

The subject of the invention is a tyre having an axis of rotation and a median plane perpendicular to the axis of rotation and comprising a crown having a crown reinforcement, a tread, radially on the outside, the tread comprising a plurality of tread pattern elements having lateral faces and a contact face intended to come into contact with the road surface while the tyre is being driven on, a plurality of circumferential grooves, each of which is delimited by outer and inner lateral faces of adjacent tread pattern elements that face one another, and is delimited by a bottom, a circumferential reinforcement made up of a rubber mixture with a stiffness greater than the stiffness of the rubber mixture of the rest of the tread and an underlayer disposed radially towards the inside and radially on the outside of the crown reinforcement characterized in that, the tyre having an outer side and an inner side, the circumferential reinforcement has a reinforcing element positioned in the tread pattern elements disposed axially on the outside with respect to one of the first and second circumferential grooves of the tread from the outside to the inside and axially close to this circumferential groove, in that the reinforcing element extends radially from the radially outer surface of the underlayer towards the outside of the tread with an axial width which decreases gradually and over a partial or total height of the thickness of the tread, in that the tread pattern elements disposed axially on the inside with respect to the first circumferential groove do not have reinforcing elements disposed close to the axially inner faces of this groove and in that the stiffness of the underlayer is less than or equal to the stiffness of the rubber mixture of the circumferential reinforcement.

The circumferential reinforcing element, viewed in meridian section, has a corner shape the point of which is oriented radially towards the outside and is thus disposed on the trailing edge of the rib or of the most highly loaded tread pattern elements on the outer side of the tread of the tyre during rapid cornering opposes, as a result of its high compressive and shear stiffness, the shearing and rocking of these tread pattern elements and thus makes it possible to maintain a large area of contact with the running surface, to limit the raised pressures on the leading edge of the rib or of the tread pattern elements and thus to limit the heating and rapid wear of the leading edge of the rib. The presence of a reinforcing element of this configuration and for a single groove already makes it possible to obtain a significant improvement in the transverse grip performance of vehicle tyres.

The circumferential reinforcing element also has the essential feature of bearing directly on the outer surface of the underlayer. Compared with direct bearing on the crown reinforcement of the tyre, a slight decrease in axial shear stiffness of the rib but a substantial increase in the rolling resistance of the tyre associated with the easier transverse and longitudinal flattening of the crown block of the tyre is observed.

It is very advantageous that the tread pattern elements disposed axially on the inside with respect to the first circumferential groove do not have reinforcing elements disposed close to the axially inner faces of this groove. This is because the presence of such reinforcing elements on the leading edge of the second rib of the tread is liable to result in deterioration of the grip properties of the tyre and of the vehicle on account of the high stiffness of the material of these reinforcing elements when these reinforcing elements come into contact with the running surface.

It should also be noted that the reduction in the volume of very stiff rubber causes a substantial reduction in the rolling resistance of the tyre with respect to the tyres disclosed in the above-cited document EP 2 708 382 A1.

Preferably, the circumferential reinforcement has two reinforcing elements positioned respectively in the tread pattern elements that are externally adjacent to the first and the second circumferential groove of the tread from the outside to the inside and axially close to the first and second circumferential grooves.

This enhances the favourable effect in terms of grip.

Advantageously, the tread having at least three circumferential grooves, the circumferential reinforcement also has a reinforcing element positioned in the tread pattern elements that are externally adjacent to the third circumferential groove of the tread from the outside to the inside and axially close to the third circumferential groove.

The circumferential reinforcement may also advantageously have reinforcing elements positioned in all of the tread pattern elements that are externally adjacent to a circumferential groove.

According to one advantageous embodiment, the circumferential reinforcement has a reinforcing element positioned in the tread pattern elements that are internally adjacent to the circumferential groove axially closest to the inner side of the tyre.

This makes it possible to stabilize the ribs or tread pattern elements on the inner side of the tyre when this inner side is loaded as a leading edge when cornering. Therefore, the same anti-rocking and anti-shearing effect associated with the high compressive stiffness of the reinforcing element is found.

According to one advantageous exemplary embodiment, the tread having at least four circumferential grooves, the circumferential reinforcement has two reinforcing elements positioned respectively in the tread pattern elements that are internally adjacent to the first and the second circumferential groove of the tread from the inside to the outside and axially close to the first and second circumferential grooves.

According to another advantageous embodiment, the circumferential reinforcing elements are disposed symmetrically with respect to the median plane of the tyre.

According to one particular exemplary embodiment, the tread having a circumferential groove through which the median plane passes, two circumferential reinforcing elements are disposed axially close to and on either side of the circumferential groove through which the median plane passes.

The shape of the circumferential reinforcing element has a cross section that tapers radially towards the outside. This enhances its effectiveness as a bearing point. The walls of this circumferential reinforcing element may be concave, convex or in the form of a staircase.

Preferably, the angle of the two lateral walls of the circumferential reinforcing element(s) is between 35 and 45 degrees.

Below 35 degrees, the effectiveness of the bearing point is reduced and beyond 45 degrees, the volume of the circumferential reinforcing element becomes too large.

According to a preferred embodiment, the reinforcing elements having a base in contact with the radially outer surface of the underlayer and a top part, the top part extends radially towards the outside to at least half the height of the lateral faces of the adjacent circumferential grooves.

This minimum height of the top parts of the circumferential reinforcing elements is useful for obtaining a stabilizing effect throughout the life of the tyre.

According to one advantageous embodiment, the top part of the reinforcing elements at least partially forms the lateral face of the adjacent circumferential groove.

According to another advantageous embodiment, the top part of the reinforcing elements is disposed at an axial distance of 1 to 8 mm and preferably 2 to 5 mm from the lateral face of the adjacent circumferential groove.

This embodiment makes it possible not to disrupt the moulding of the circumferential grooves of the tread while retaining a substantial effect of improving the transverse grip performance of the tyres of a vehicle.

The base of the reinforcing elements may advantageously extend axially under at least some of the bottoms of the adjacent circumferential grooves.

This embodiment has the advantage of enhancing the effectiveness of the circumferential reinforcing element(s).

According to another exemplary embodiment, the base of the reinforcing elements extends axially under the tread pattern elements on the opposite side from the adjacent circumferential grooves.

As before, this has the advantage of stabilizing the circumferential reinforcing elements.

According to another advantageous exemplary embodiment, the bases of the reinforcing elements may be axially contiguous and extend axially over at least 50% of the axial width of the tread of the tyre.

Very advantageously, the bases of the axially contiguous reinforcing elements extend axially over at most the axial width of the crown reinforcement. This makes it possible to keep good flattening of the two shoulders of the tyre and to limit the consequences in terms of the rolling resistance of the tyre from the use of a rubber mixture of very high stiffness.

Advantageously, the rubber mixture of which the circumferential reinforcement is made has a dynamic shear modulus $G^*$, measured at 60° C. at 10 Hz and under an alternating shear stress of 0.7 MPa, of greater than 20 MPa and preferably greater than 30 MPa.

Very advantageously, the rubber mixture of the tread has a dynamic shear modulus $G^*$, measured at 60° C. at 10 Hz and under an alternating shear stress of 0.7 MPa, of less than or equal to 1.3 MPa and preferably less than 1.1 MPa.

The presence of the circumferential reinforcement makes it possible to make full use of the grip capabilities of such a tread rubber mixture of very low stiffness. This is particularly useful in the case of a tyre for a passenger vehicle.

According to an alternative embodiment, the sublayer is interrupted axially under at least one of the circumferential grooves of the tread. This makes it possible to gain axial shear stiffness without losing the ease of flattening for rigid underlayers.

The invention relates more particularly to tyres intended to equip motor vehicles with three of more wheels, of the passenger vehicle type, SUV ("Sport Utility Vehicle"), such as industrial vehicles chosen from vans, heavy-duty vehicles, that is to say, underground trains, buses, heavy road transport vehicles (lorries, tractors, trailers) or off-road vehicles, such as heavy agricultural or construction plant vehicles, other transportation or handling vehicles and two-wheeled vehicles (notably motorcycles), or aircraft.

DESCRIPTION OF THE FIGURES

The subjects of the invention will now be described with the aid of the appended drawing, in which.

DETAILED DESCRIPTION OF THE INVENTION

Figure 1:
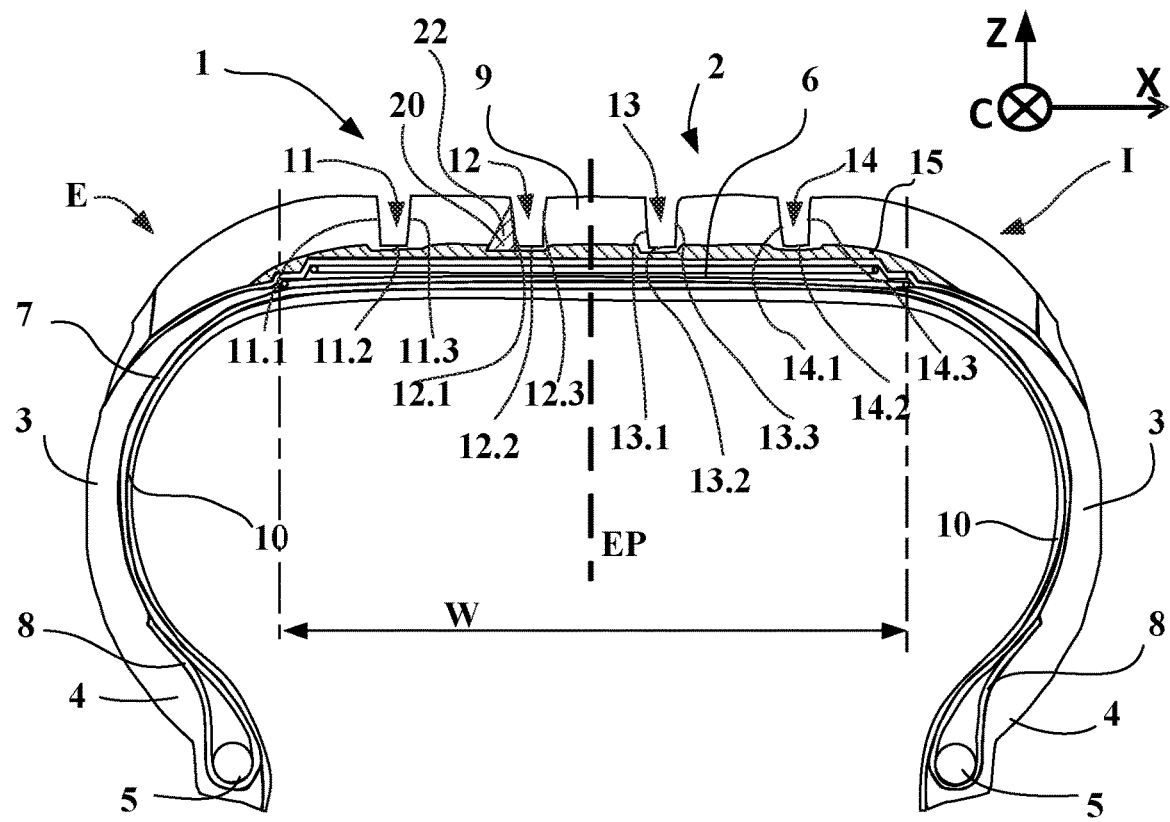
FIG. 1 very schematically shows (without being drawn to any particular scale) a meridian cross section through a tyre according to one embodiment of the invention.

FIG. 1 schematically shows a meridian cross section of a pneumatic tyre or tyre incorporating a circumferential reinforcement 20 according to one embodiment of the invention.

The tyre 1 has an outer side E intended to be positioned towards the outside of a vehicle and an inner side I intended to be positioned towards the inside of a vehicle. This tyre thus exhibits tread asymmetry.

FIG. 1 also indicates the axial X, circumferential C and radial Z directions and also the median plane EP (plane perpendicular to the axis of rotation of the tyre which is situated halfway between the two beads 4 and passes through the middle of the crown reinforcement 6).

This tyre 1 has a crown 2 reinforced by a crown reinforcement or belt 6, two sidewalls 3 and two beads 4, each of these beads 4 being reinforced with a bead wire 5. The crown reinforcement 6 is surmounted radially on the outside by a rubber tread 9. A rubber underlayer 15 is located between the crown reinforcement and the tread. A carcass reinforcement 7 is wound around the two bead wires 5 in each bead 4, the turn-up 8 of this reinforcement 7 being, for example, disposed towards the outside of the tyre 1. In a manner known per se, the carcass reinforcement 7 is made up of at least one ply reinforced by what are known as "radial" cords, for example of textile or metal, that is to say that these cords are disposed virtually parallel to one another and extend from one bead to the other so as to form an angle of between 80° and 90° with the median circumferential plane EP. An airtight layer 10 extends from one bead to the other radially on the inside with respect to the carcass reinforcement 7.

Depending on the objective of the tyre designer, the mixture of this underlayer 15 may be of low hysteresis and low stiffness and thus improve the rolling resistance of the tyre or be stiffer than the rubber mixture that forms the tread 9; in this latter case the underlayer has an action of increasing the shear stiffness of the tread of the tyre. The stiffness of this underlayer 15 is, however, still less than that of the rubber mixture of the circumferential reinforcements. In one particular embodiment, simplifying the industrial production of a tyre according to the invention, the rubber mixture of the underlayer and the constituent rubber mixture of the tread are identical.

The tread 9 has four grooves 11, 12, 13 and 14 from the outer side E to the inner side I. Each groove has an outer face 11.1, 12.1, 13.1 and 14.1, a groove bottom 11.2, 12.2, 13.2 and 14.2 and an inner face 11.3, 12.3, 13.3 and 14.3.

This tread 9 also has a circumferential reinforcement 20 made up of a reinforcing element 22 disposed adjacently to the outer wall 12.1 of the second groove 12. This reinforcing element 20 bears directly against the radially outer wall of the underlayer 15 and has a substantially triangular cross section. This reinforcing element partially forms the outer wall 12.1 of the groove 12 in the embodiment shown.

The circumferential reinforcement 20 opposes the rocking and shearing of the rib externally adjacent to the groove 12 during strong transverse loads on the tyre that are oriented axially from the outside to the inside, for example during cornering of the vehicle on which the tyre is mounted in the direction of the inner side of the tyre.

FIGS. 2 to 10 depict radial cross sections of treads according to different embodiments of the invention in the case of tread patterns with three circumferential grooves.

Figure 2:
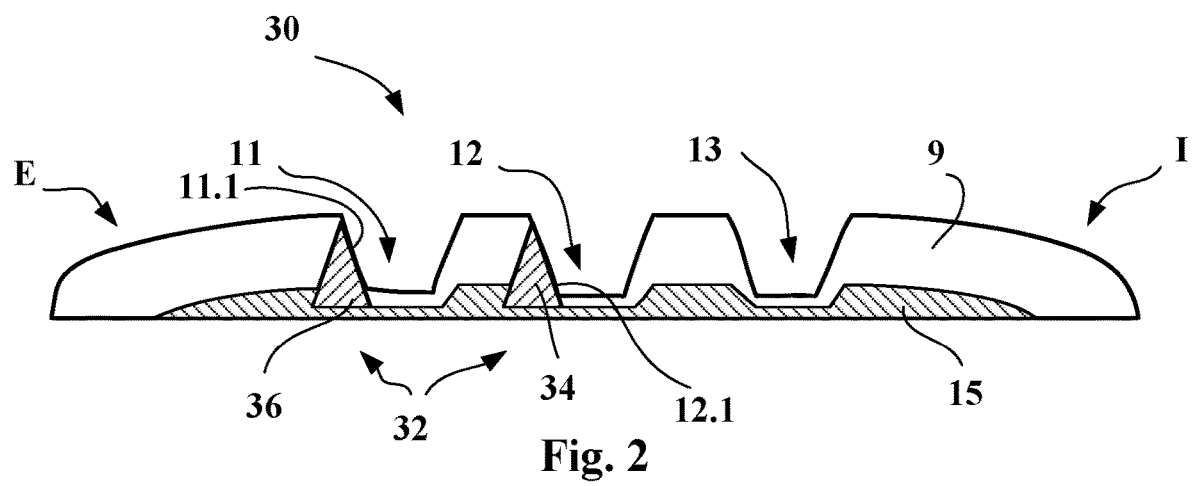
FIGS. 2 to 11 depict treads of tyres according to different embodiments of the invention in meridian cross section.

The tread 30 in FIG. 2 has three grooves 11, 12 and 13 and also a circumferential reinforcement 32 comprising two circumferential reinforcing elements 34 and 36. The circumferential reinforcing element 34 is disposed as in FIG. 1, adjacently to the outer wall 12.1 of the second groove 12. This circumferential reinforcing element 34 bears against the radially outer wall of the underlayer 15 and partially forms the outer wall 12.1 of the groove 12.

The additional circumferential reinforcing element 36 is disposed adjacently to the outer wall 11.1 of the first groove 11. Through its presence, it opposes the shearing and rocking of the tread pattern elements externally adjacent to the first groove 11 and thus cooperates with the action of the circumferential reinforcing element 34 during strong transverse loads on the tyre. The tread has a rubber underlayer 15 in direct contact with the outer surface of the crown reinforcement 6 on one side and with the tread 9 and the base of the reinforcing elements 34 and 36 on the other.

Figure 3:
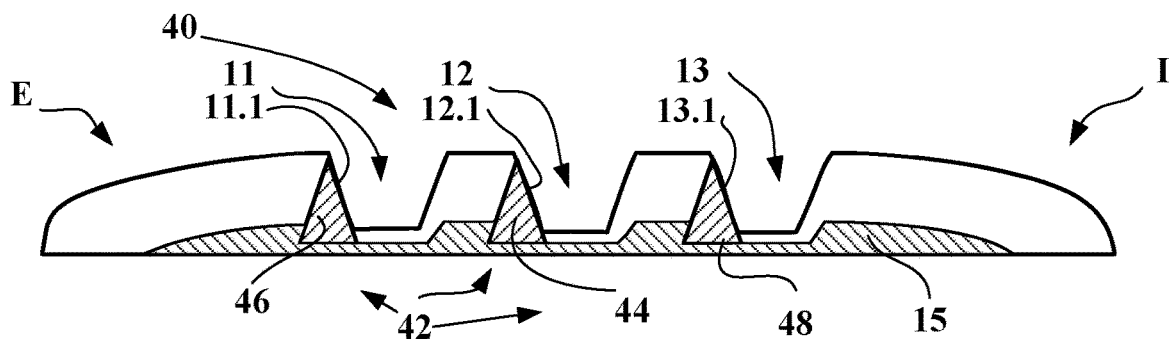

The circumferential reinforcement 42 of the tread 40 in FIG. 3 comprises three circumferential reinforcing elements 44, 46 and 48. The additional circumferential reinforcing element 48 with respect to the circumferential reinforcement 32 of FIG. 2 is disposed adjacently to the outer wall 13.1 of the third groove. The three circumferential reinforcing elements of this tread 40 cooperate so as to oppose the rocking and shearing of the tread pattern elements externally adjacent to the three grooves during strong transverse loads oriented from the outside to the inside. As above, the rubber underlayer 15 is disposed between the crown reinforcement 6 and the tread 9 and the three circumferential reinforcing elements.

Figure 4:
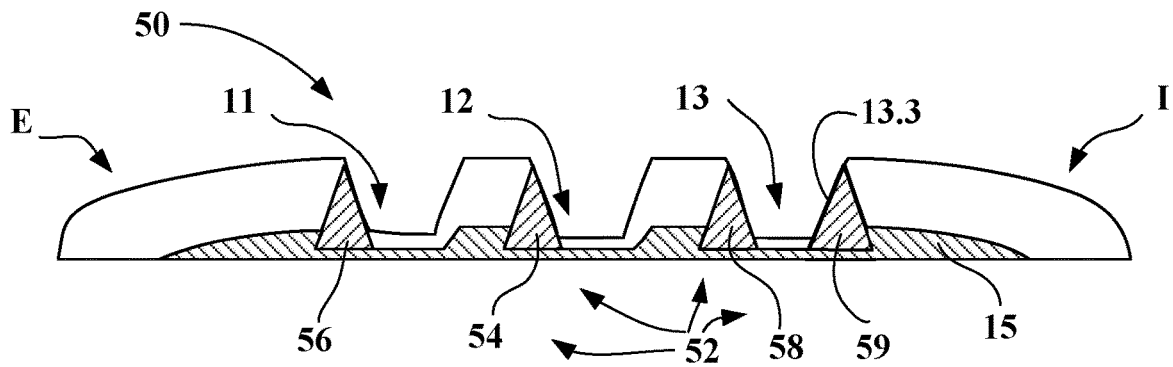

FIG. 4 shows an embodiment of a tread 50 according to one of the subjects of the invention, in which the circumferential reinforcement 52 comprises, as in FIG. 3, three elements 54, 56 and 58 and an additional circumferential reinforcing element 59. This circumferential reinforcing element 59 is disposed adjacently to the inner wall 13.3 of the groove 13. This circumferential reinforcing element 59 opposes the rocking and shearing of the tread pattern elements internally adjacent to the third groove 13 during transverse loads oriented from the inside to the outside. In such a case, taking into account the dynamics of vehicles when cornering, the loads oriented from the inside to the outside are markedly less strong than those oriented in the other direction and it is unnecessary to add further circumferential reinforcing elements. In a bend at the limits of grip, the tyre disposed on the vehicle inside the bend is strongly unloaded, taking into account the dynamics of vehicles when cornering. This tyre on the inside of the bend nevertheless contributes towards transverse grip through its leading shoulder, situated towards the vehicle. The presence of a reinforcement on the asymmetric tyre makes it possible to increase the overall thrust at the axle, resulting from the thrust of the two tyres on the same axle. The base of the four circumferential reinforcing elements bears directly on the radially outer surface of the underlayer 15.

Figure 5:
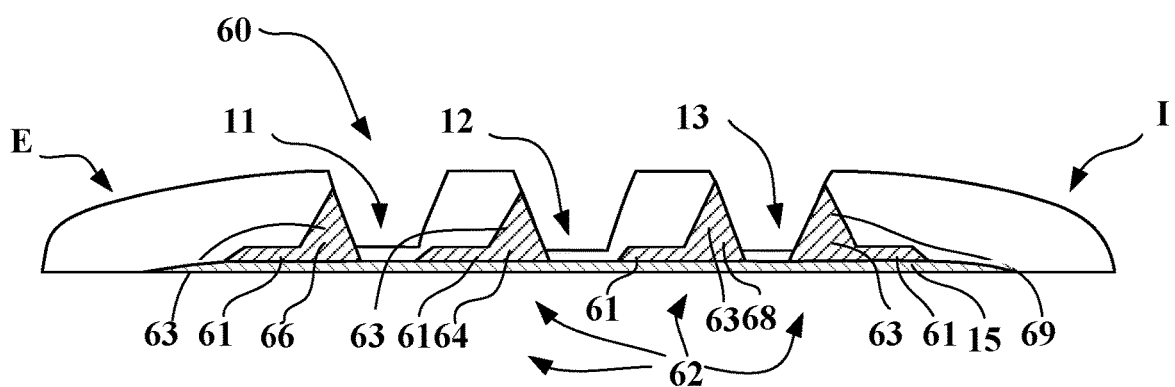

In FIG. 5, the tread 60 comprises a circumferential reinforcement 62 made up of four circumferential reinforcing elements 64, 66, 68 and 69 disposed in a similar manner to FIG. 4. These four circumferential reinforcing elements have a base 61 and a top part 63. In the embodiment shown, the bases 61 in direct contact with the outer surface of underlayer 15 extend under the ribs or tread pattern elements adjacent to the three grooves. These extensions enhance the stiffening provided by the various circumferential reinforcing elements.

Figure 6:
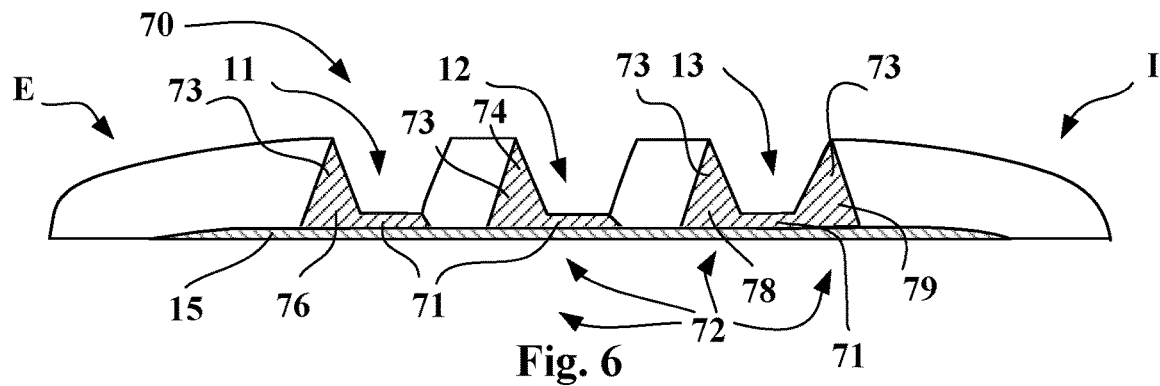

In FIG. 6, the tread 70 comprises a circumferential reinforcement 72 made up, as in FIG. 5, of four circumferential reinforcing elements 74, 76, 78 and 79. These circumferential reinforcing elements have top parts 73 and bases 71 and are such that their bases 71 extend under the adjacent grooves. As before, the bases are in direct contact with the underlayer 15 and enhance the stiffening provided by the various circumferential reinforcing elements. The radial height of the bases 71 is substantially equal to the radial position of the bottoms of the grooves and thus they form the bottom of the ribs. According to one alternative embodiment, the bottom of the ribs remains formed only by the mixture of the tread.

Figure 7:
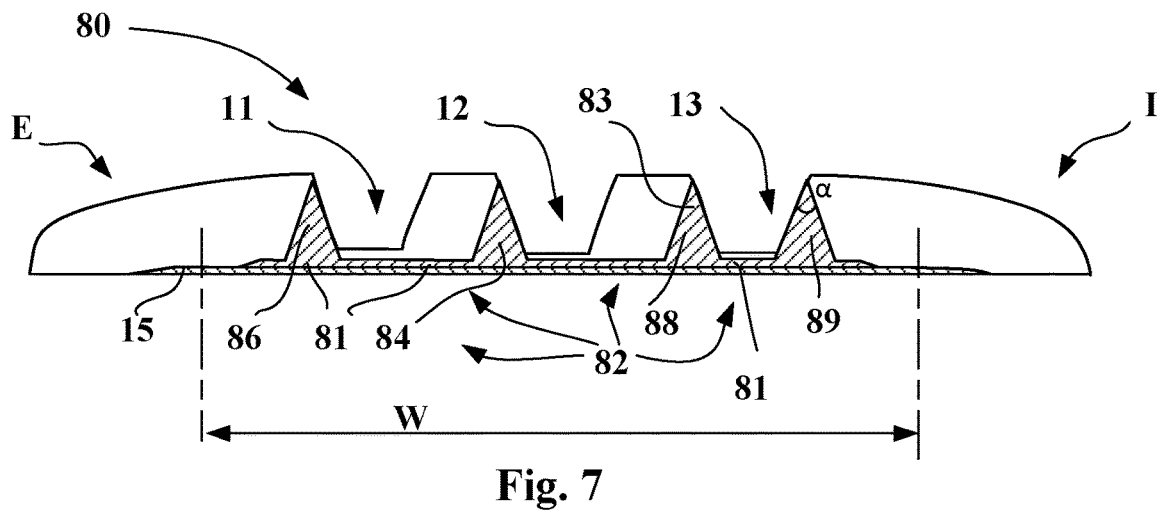

In FIG. 7, the tread 80 has a circumferential reinforcement 82 made up of four circumferential reinforcing elements 84, 86, 88 and 89 such that their bases 81 are axially contiguous and extend continuously from one side of the tread to the other. This base 81 is thus in continuous direct contact with the radially outer surface of the rubber underlayer 15 and has a marked action of stiffening the entire crown 2 of this tyre. The top parts 83 of the reinforcing elements partially form the lateral faces of the adjacent ribs.

The axial width of the axially contiguous bases 81 covers at least half the axial width of the tread and at most the axial width W of the crown reinforcement 6. The fact that the bases are continuous enhances the resistance to rocking of the entire crown block 2 during transverse loads and the fact that they do not extend beyond the axial width of the crown reinforcement 6 promotes the flattening the shoulders and limits the rolling resistance of the tyre.

The shape of the circumferential reinforcing elements depicted is triangular, but this shape may vary and the lateral walls may be concave, convex or in the form of a staircase, notably without departing from the scope of this invention.

In the examples depicted, the angle α made by these two lateral walls is around 40 degrees, i.e. between 35 and 45 degrees.

The radial height of the circumferential reinforcing elements may reach the contact face of the tread pattern elements when the tyre is new, but may also be smaller. It should not be less than half the height of the tread pattern elements in order to be able to act throughout the life of the tyre.

Figure 8:
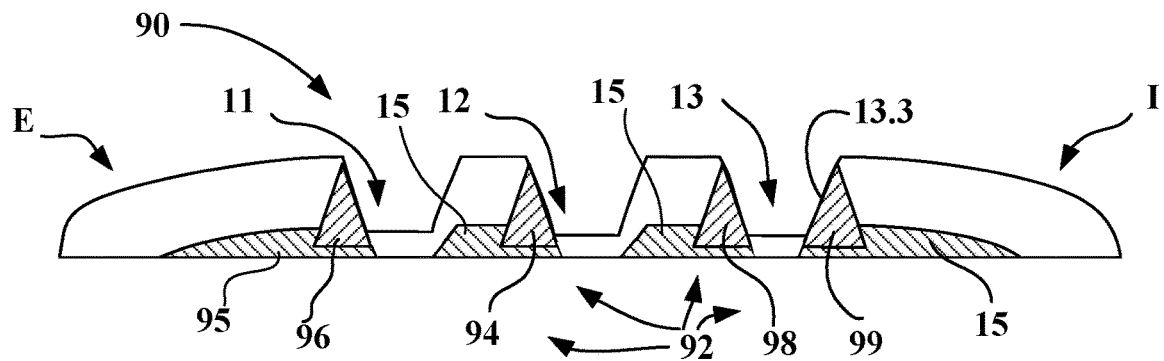

FIG. 8 depicts a tread 90, the circumferential reinforcement 92 of which consists of four circumferential reinforcing elements 94, 96, 98 and 99 as illustrated in FIG. 4. The four circumferential reinforcing elements are in abutment against the radially outer surface of the rubber underlayer 95. However, in this exemplary embodiment, the underlayer 95 is interrupted axially under the bottoms of the grooves 11, 12 and 13. This underlayer 95 is thus made up of four circumferential strips. This embodiment has the advantage of not restricting the transverse flattening when the underlayer 95 has a stiffness greater than that of the tread.

The circumferential reinforcing elements should serve as a bearing point for opposing the shearing and rocking of the tread pattern elements which contain them. For this purpose, the mixture of which these circumferential reinforcing elements are made is preferably very substantially stiffer than that of the tread 9. Preferably, the dynamic shear modulus G*, measured at 60° C. at 10 Hz and under an alternating shear stress of 0.7 MPa, is greater than 20 MPa and very preferentially greater than 30 MPa.

Such mixtures are described in particular in the Applicants' application WO 2011/045342 A1.

Table 1 below gives an example of such a formulation.

TABLE 1

| Constituent | C.1 |
|---|---|
| NR (1) | 100 |
| Carbon black (2) | 70 |
| Phenol-formaldehyde resin (3) | 12 |
| ZnO (4) | 3 |
| Stearic acid (5) | 2 |
| 6PPD (6) | 2.5 |
| HMT (7) | 4 |
| Sulfur | 3 |
| CBS (8) | 2 |

(1) Natural rubber;
(2) Carbon black N326 (name according to standard ASTM D-1765);
(3) Phenol-formaldehyde novolac resin ("Peracit 4536K" from Perstorp);
(4) Zinc oxide (industrial grade - Umicore);
(5) Stearin ("Pristerene 4931" from Uniqema);
(6) N-(1,3-dimethylbutyl)-N-phenylparaphenylenediamine (Santoflex 6-PPD from Flexsys);
(7) Hexamethylenetetramine (from Degussa);
(8) N-cyclohexylbenzothiazolesulfenamide (Santocure CBS from Flexsys).

This formulation makes it possible to obtain mixtures of high stiffness, in particular by virtue of the combined action of an epoxy resin and an amine-comprising curing agent. The shear modulus G* measured under an alternating shear stress of 0.7 MPa at 10 Hz and 60 degrees Celsius is 30.3 MPa.

This very stiff material for circumferential reinforcements is preferably used in treads of low stiffness with dynamic moduli G* of less than 1.3 MPa and preferably less than or equal to 1.1 MPa.

The following Table 2 gives an example of a suitable formulation:

TABLE 2

| Composition | B1 |
|---|---|
| SBR (a) | 100 |
| Silica (b) | 110 |
| Coupling agent (c) | 9 |
| Liquid plasticizer (d) | 20 |
| Resin plasticizer (e) | 50 |
| Black | 5 |
| Zinc oxide | 3 |
| Stearic acid | 2 |
| Antioxidant (f) | 2 |
| Accelerator (g) | 2 |
| DPG | 2 |
| Sulfur | 1 |

The formulations are given by weight.
(a) SBR with 27% styrene, 1,2-butadiene: 5%, cis-1,4: 15%, trans-1,4: 80% Tg −48° C.;
(b) "Zeosil1165MP" silica from Solvay with BET surface area of 160 m²/g;
(c) "SI69" TESPT silane from Evonik;
(d) "Flexon 630" TDAE oil from Shell;
(e) "Escorez 2173" resin from Exxon;
(f) Antioxidant "Santoflex 6PPD" from Solutia;
(g) Accelerator "Santocure CBS" from Solutia.

The dynamic shear modulus after vulcanization is 0.9 MPa.

Figure 9:
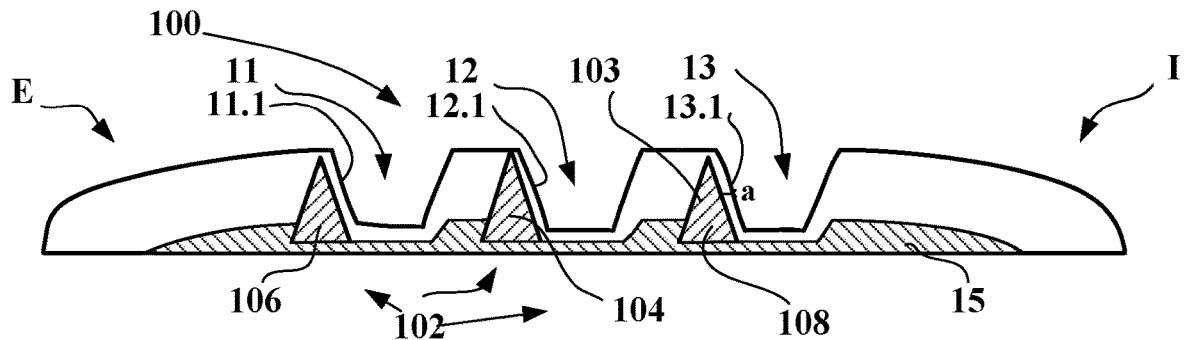

FIG. 9 depicts a tread 100 with a circumferential reinforcement 102 having three circumferential reinforcing elements 104, 106 and 108 disposed, as in FIG. 3, directly bearing on the underlayer 15, close to the three grooves and on the outside. However, in this example, the inner lateral walls of the top parts 103 of the three circumferential reinforcing elements do not form part of the outer faces of the ribs but are offset axially towards the outside so as to be spaced apart from these outer faces of the ribs by a distance a of 1 to 8 mm and preferably from 2 to 5 mm. This offset makes it possible not to disrupt the moulding of the ribs during the vulcanization of the tyres without decreasing the effectiveness of the circumferential reinforcing elements.

In this FIG. 9, it can also be seen that the top part of the circumferential reinforcing element 104 extends radially as far as the outer face of the tread pattern element. This makes it easier for electrostatic charges to be discharged on account of the conductive nature of the mixture of the circumferential reinforcing element.

Figure 10:
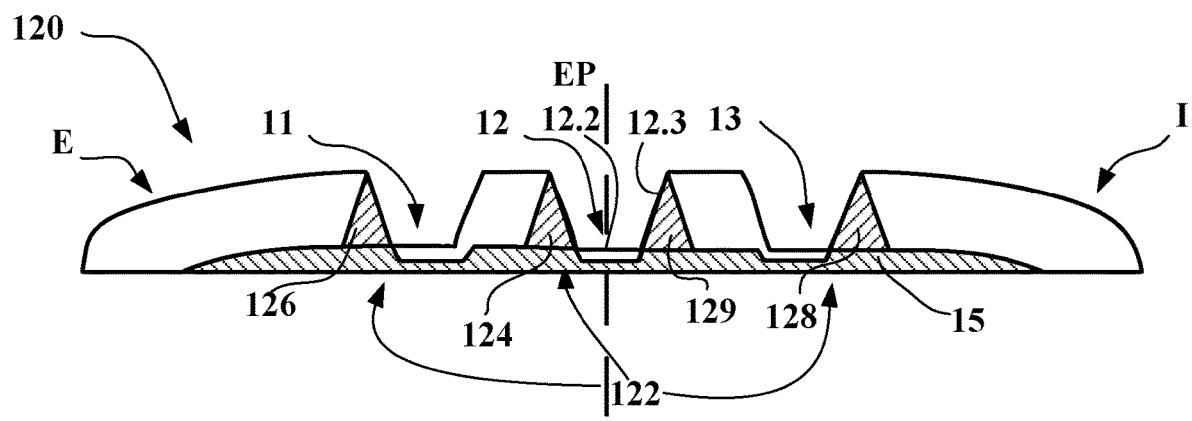
Figure 11:
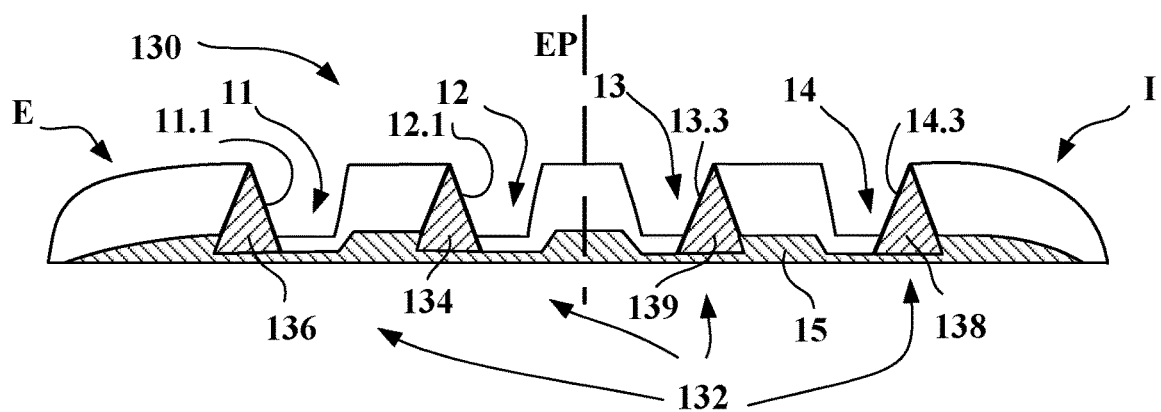

FIGS. 10 and 11 depict another embodiment of a tyre according to a subject of the invention in which the circumferential reinforcements are disposed symmetrically in the tread.

The tread 120 of FIG. 10 has three grooves 11, 12 and 13 and also a circumferential reinforcement 122. In this embodiment according to one of the subjects of the invention, the circumferential reinforcement 122 comprises four circumferential reinforcing elements 124, 126, 128 and 129 disposed symmetrically with respect to the median plane EP and directly bearing on the surface of the underlayer 15. The three circumferential reinforcing elements 124, 126, and 128 are disposed like the reinforcing elements 54, 56 and 59 in FIG. 4. By contrast, the reinforcing element 129 is disposed axially on the inside with respect to the groove 12 and thus forms at least part of the inner face 12.3 of this groove. The circumferential reinforcement 122 thus does not add any asymmetry to the tread 120, thereby making it easier to mount such a tyre when it does not have any other asymmetry. Such a tyre may thus have its outer side mounted towards the outside or inside of a vehicle, these inner and outer sides being only a geometric reference in this case.

FIG. 11 depicts a tread 130 with four grooves 11, 12, 13, 14 and a circumferential reinforcement 132. This circumferential reinforcement 132 has four circumferential reinforcing elements 134, 136, 138 and 139 which bear against the surface of the underlayer 15. As in the embodiment in FIG. 12, these four circumferential reinforcing elements are disposed symmetrically with respect to the median plane EP of the tyre. The reinforcing elements 134 and 136 are disposed axially on the outside with respect to the grooves 12 and 11, respectively; the reinforcing elements 138 and 139 are disposed axially on the inside with respect to the grooves 14 and 13, respectively.

A person skilled in the art, who is a tyre designer, should be able to adapt the number and the position of the circumferential reinforcing elements in order to obtain optimum resistance to the rocking and shearing of the ribs and tread pattern elements, specifically for tyres which are asymmetrical or not.

Tests

The rubber mixtures are characterized as follows.

The dynamic properties are well known to those skilled in the art. These properties are measured on a viscosity analyser (Metravib VA4000) with test specimens moulded from uncured mixtures or test specimens bonded together from vulcanized to mixtures. The test specimens used are described in the standard ASTM D 5992-96 (the version published in September 2006 but initially approved in 1996 is used) in Figure X2.1 (circular test specimens). The diameter "d" of the test specimens is 10 mm (the circular cross section is thus 78.5 mm$^2$), the thickness "L" of each portion of mixture is 2 mm, giving a "d/L" ratio of 5 (as opposed to the standard ISO 2856, mentioned in paragraph X2.4 of the ASTM standard, which recommends a d/L value of 2).

The response of a sample of vulcanized composition subjected to a simple alternating sinusoidal shear stress at a frequency of 10 Hz is recorded. The maximum shear stress imposed is 0.7 MPa.

The measurements are made with a temperature change of 1.5° C. per minute, from a minimum temperature lower than the glass transition temperature (Tg) of the mixture or rubber to a maximum temperature greater than 100° C. Before the test begins, the test specimen is conditioned at the minimum temperature for 20 minutes to ensure good homogeneity of temperature in the test specimen.

The result used is notably the value of the dynamic shear modulus G* at a temperature of 60° C.

The performance of the tyres according to the subjects of the invention were measured during the following tests:
  Longitudinal braking distance: the distance required to go from 80 to 20 km/h on wet ground is measured.
  Cornering stiffness: the axial lateral thrust force of the tyre is measured during rolling for a given drift angle.
  Speed test on Charade circuit: the test consists of four laps and the performance selected is the average of the four timings. A test is carried out with control tyres at the beginning and at the end of the tests in order to be able to correct a possible drift associated for example with a change in the air temperature and ground temperature conditions.

Trials

Figure 12:
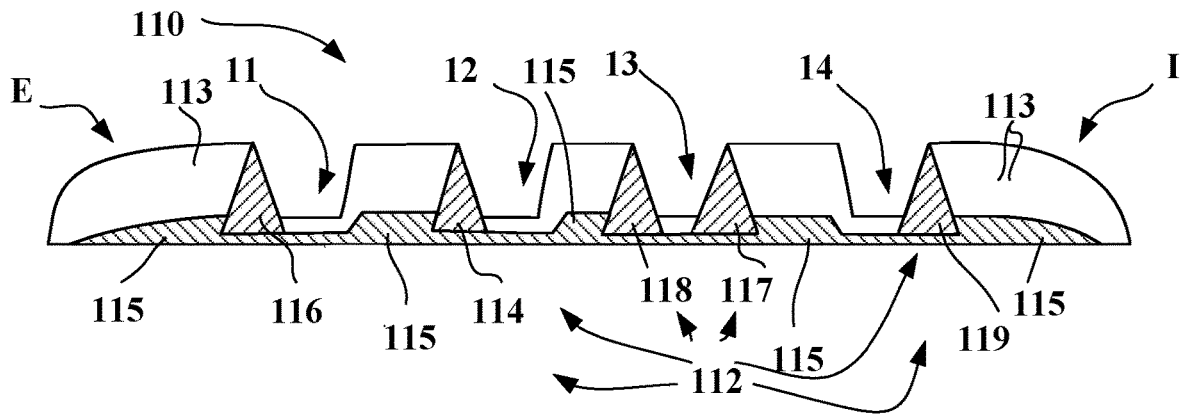
FIG. 12 shows the embodiment of the tested tread in meridian cross section.

FIG. 12 very schematically depicts a cross section of the tread of the tyres used for vehicle tests.

The tread 110 has four grooves 11, 12, 13 and 14. Two mixtures make up the tread, the mixture 113 radially on the outside and the underlayer 115. It also has a circumferential reinforcement 112 comprising five circumferential reinforcing elements 114, 116, 117, 118 and 119 directly bearing on the radially outer surface of the underlayer 115. The circumferential reinforcing elements 114, 116 and 118 are each disposed adjacently to an outer face of one of the three ribs disposed furthest towards the outside. The circumferential reinforcing elements 119 and 120 are for their part disposed adjacently to an inner face of one of the two ribs disposed furthest towards the inside. The third rib is thus reinforced by two circumferential reinforcing elements. Each circumferential reinforcing element has a substantially triangular shape and is intended to be in direct contact with the radially outer surface of the rubber underlayer 115 and one of its lateral walls partially forms a lateral face of a rib.

The tread 110 of the test tyres was produced by means of a profile having the two mixtures of which the tread 113 and the underlayer 115 are made, obtained by coextrusion. This profile had four grooves. Profiles of the same length corresponding to the four circumferential reinforcing elements were also produced by extrusion. Then, four mixture volumes, each corresponding to the volume and shape of a circumferential reinforcing element, were removed from the coextruded profile of the two mixtures of the tread with a heated chisel and the four circumferential reinforcing elements were placed manually in the four volumes thus prepared. The treads thus assembled were then placed on the crown of a tyre in a manner well known to a person skilled in the art to complete it. The complete tyres were then vulcanized as usual in a curing press.

The reference tyres are Michelin tyres of the Pilot Sport 3 type, size 225/45 R17, pressure 2.3 bar at the front and 2.7 bar at the rear, and the test vehicle is a Renault Clio Cup model.

These reference tyres R1 have a tread with a mixture having a dynamic shear modulus G* at 60° C. of 1.4 MPa.

Other reference tyres R2 were also produced. The tread of these tyres is identical to that of FIG. 12 except for the four circumferential reinforcing elements and the underlayer, which are absent. These tyres have a tread pattern formed only by the four circumferential grooves indicated.

The tread mixture of the reference tyres R2 has a G* value at 60° C. of 0.9 MPa.

The test tyres E1 have a tread mixture with a G* value of 0.9 MPa and the circumferential reinforcing elements are produced with a mixture with a G* value of 30 MPa. These tyres E1 have a circumferential reinforcement corresponding to that of FIG. 10, but no underlayer.

Other tyres E2 according to the invention were produced with a tread and a circumferential reinforcement such as E1, but additionally an underlayer. Preferably, the mixture of which the underlayer is made has a dynamic shear modulus G*, measured at 60° C. at 10 Hz and under an alternating shear stress of 0.7 MPa, of less than 20 MPa and preferably less than 10 MPa. In the tyres E2, the underlayer mixture has a dynamic shear modulus G* equal to 5 MPa. This underlayer is continuous as indicated in FIG. 12. The thickness of this underlayer is around 2 mm in the tread pattern.

The circumferential reinforcing elements have an angle of 40 degrees between their lateral walls.

TABLE 3

|  | Braking on wet ground 80-20 km/h | Cornering stiffness |
| --- | --- | --- |
| R1 | 100 | 100 |
| R2 | 115 | 85 |
| E1 | 110 | 100 |

The use of a tread of lower stiffness normally reduces the cornering stiffness of the tyre and improves the braking performance on wet ground.

The tyre tested according to the invention makes it possible to obtain a gain of 10 points in the braking performance on wet ground while having a cornering stiffness comparable to that of the control R1.

TABLE 4

|  | Timing | Timing gain |
| --- | --- | --- |
| R1 | 2 min 18 s | — |
| R2 | 2 min 17.7 | 0.3 s |
| E1 | 2 min 17.2 | 0.8 s |
| E2 | 2 min 17.0 | 1.0 s |

A gain is considered significant starting from 0.3 s on this circuit.

It can be seen that the use of a tread with a much less stiff mixture results in only a barely significant gain whereas the results obtained with the tyres having circumferential reinforcements according to the invention are very marked.

The presence of the circumferential reinforcements in the tread thus makes it possible to make full use of the grip potential of tread mixtures of lower stiffness.

By combining the choice of mixture of the tread, the choice of mixture of the underlayer and the circumferential reinforcements, it is then possible for the tyre designer to offset the compromises between grip and, respectively, behaviour and rolling resistance, this not being attainable through the choice of a single material of the tread.

The invention claimed is:

1. A tire having an axis of rotation and a median plane perpendicular to the axis of rotation, and comprising a crown having:
    a crown reinforcement; and
    a tread radially on the outside of the crown reinforcement, the tread comprising:
        a plurality of tread pattern elements having lateral faces and a contact face intended to come into contact with a road surface while the tire is being driven on;
        a plurality of circumferential grooves, each of which is delimited by outer lateral faces and inner lateral faces of adjacent tread pattern elements that face one another, and is delimited by a bottom;
        a circumferential reinforcement made up of a rubber mixture with a stiffness greater than a stiffness of the rubber mixture of the tread pattern elements; and
        an underlayer disposed radially on the inside of the circumferential reinforcement and radially on the outside of the crown reinforcement,
    wherein the tire has an outer side and an inner side,
    wherein the circumferential reinforcement has a reinforcing element positioned in the tread pattern elements disposed axially on the outside with respect to one of a first circumferential groove and a second circumferential groove of the tread from the outside to the inside,
    wherein the reinforcing element extends radially from the radially outer surface of the underlayer towards the outside of the tread with an axial width which decreases gradually and over a partial or total height of a thickness of the tread,
    wherein the tread pattern elements disposed axially on the inside with respect to the first circumferential groove do not have reinforcing elements disposed close to the axially inner faces of the groove,
    wherein a stiffness of the underlayer is less than or equal to the stiffness of the rubber mixture of the circumferential reinforcement, and
    wherein a dynamic shear modulus G*, measured at 60° C. at 10 Hz and under an alternating shear stress of 0.7 MPa, for the circumferential reinforcement is greater than 20 MPa and a dynamic shear modulus G*, measured at 60° C. at 10 Hz and under an alternating shear stress of 0.7 MPa, for the tread is less than or equal to 1.3 MPa.

2. The tire according to claim 1, wherein the circumferential reinforcement has two reinforcing elements positioned respectively in the tread pattern elements that are externally adjacent to the first and the second circumferential groove of the tread from the outside to the inside.

3. The tire according to claim 1, wherein, the tread having at least three circumferential grooves, the circumferential reinforcement also has a reinforcing element positioned in the tread pattern elements that are externally adjacent to a third circumferential groove of the tread from the outside to the inside.

4. The tire according to claim 1, wherein the circumferential reinforcement has reinforcing elements positioned in all of the tread pattern elements that are externally adjacent to a circumferential groove.

5. The tire according to claim 1, wherein the circumferential reinforcement also has a reinforcing element positioned in the tread pattern elements that are internally adjacent to the circumferential groove axially closest to the inner side of the tire.

6. The tire according to claim 5, wherein the tread having at least four circumferential grooves, the circumferential reinforcement has two reinforcing elements positioned respectively in the tread pattern elements that are internally adjacent to the first and the second circumferential grooves of the tread from the inside to the outside.

7. The tire according to claim 1, wherein the circumferential reinforcing elements of the circumferential reinforcement are disposed symmetrically with respect to the median plane.

8. The tire according to claim 7, wherein, the tread having a circumferential groove through which the median plane passes, two circumferential reinforcing elements are disposed axially close to and on either side of the circumferential groove through which the median plane passes.

9. The tire according to claim 1, wherein an angle of two lateral walls of a reinforcing element is between 35 and 45 degrees.

10. The tire according to claim 1, wherein, the reinforcing elements having a base disposed radially on the outer surface of the underlayer and a top part, the top part extends radially towards the outside to at least half the height of the lateral faces of adjacent circumferential grooves.

* * * * *